United States Patent [19]

Krepets et al.

[11] Patent Number: 5,053,113

[45] Date of Patent: Oct. 1, 1991

[54] METHOD OF CHITIN PRODUCTION FROM CHITIN CONTAINING RAW MATERIALS

[76] Inventors: Guennadi I. Krepets, Mozhaiskoe Shosse, 135/98, Moscow, Odintsovo 5; Alexandre Y. Mikhailine, Leningradskoe Shosse, 112, k.4/kv. 1071, Moscow 125445, both of U.S.S.R.

[21] Appl. No.: 523,686

[22] Filed: May 16, 1990

[51] Int. Cl.$^5$ .............................................. C25F 5/00
[52] U.S. Cl. ..................................... 204/130; 204/131
[58] Field of Search ................................ 204/130, 131

[56] References Cited

U.S. PATENT DOCUMENTS 2,743,220  4/1956  Estes ..................................... 204/131
3,533,940 10/1970  Peniston et al. .................... 210/728
4,159,932  7/1979  Peniston et al. ................. 204/157.68

FOREIGN PATENT DOCUMENTS 63400  6/1978  Japan .

OTHER PUBLICATIONS

McGraw-Hill Encyclopedia of Science and Technology 6th Ed. vol. 3, pp. 538-539.

*Primary Examiner*—John F. Niebling
*Assistant Examiner*—Steven P. Marquis

[57] ABSTRACT

Chitin and chitosan are produced by alkali treating of a chitin-containing fragmented raw material, which includes an electrochemical process in NaOH solution, with a constant electrical current source of 4-11 A, a density of 0.05-0.2 A/cm2, a current of 15-50 V, for 10-45 minutes, with the raw material and NaOH solution at a proportion of 1:1.5-1:4 while the concentration of NaOH solution remains 0.15-2%.

2 Claims, No Drawings

METHOD OF CHITIN PRODUCTION FROM CHITIN CONTAINING RAW MATERIALS

Described below is a method of chitin production from chitin-containing raw materials such as insects (cockroaches), hydroids, shells of crabs, lobsters, langostinos, crayfish, shrimp, starfish, or chitin-containing waste.

The above-mentioned raw materials (The process was developed and carried out on a frozen shell containing raw material) are pounded, reduced in volume, placed in a reaction vessel. A 0.15–2% NaOH solution is then added with a weight ratio of 1:15–1:4 in relation to the initial raw materials.

After placement in a reaction vessel, the reaction mixture is constantly stirred and a constant current source of 4–11 A is passed through, with a density of 0.1–0.2 $A/cm^2$, and a current of 15–50 V, for 10–45 minutes.

The heat generated by the exothermal electrochemical reactions increases the temperature of the reaction vessel from 20°–70° C.

Several processes which occur due to passage of the electrical current through the aqueous NaOH solution containing an equal distribution of particles of chitin-containing materials cause a breaking of the chemical bonds between chitin and proteins, caroteinoids, lipids, and mineral substances. These are: 1) Electrical dissociation with movement of the products of the dissociation towards positively and negatively charged electrodes. 2) Catalytic hydrolysis in the presence of a catalyst (NaOH).

After 15–20 minutes of electroprocessing of the aqueous NaOH solution containing an equal distribution of particles of chitin-containing raw material, the electrical current is shut off and mixing is stopped. The contents of the reaction vessel are separated into liquid (hydrolysate) and solid (chitin) phases. The chitin obtained is then washed in water.

The chitin then begins a deacetylation process in order to produce chitozan. Chitin deacetylation (chitozan production) is conducted in a 50% NaOH solution at 105°–110° C. in 40–60 minutes in a reaction vessel, with mixing equipment. After 40–60 minutes, the contents of the reaction vessel are separated into liquid and solid (chitozan) phases. The chitozan obtained is then washed in water.

EXAMPLE 1

Frozen, blanched, chitin-containing waste; protein content in 5 kg of raw material is being electrochemically treated with a current of 11 A, density—0.2 $A/cm^2$, voltage—50 V, in a 2% NaOH aqueous solution, at a phase proportion of 1:4 (weight of chitin-containing waste to weight of alkali solution), at 20° C., for 45 minutes, with agitation. The reaction mixture was separated into chitin and hydrolysate. The chitin obtained was washed with water.

Obtained: 500 g of chitin with 70% moisture. Moist chitin yield in proportion to initial frozen raw material—4%. Chitozan yield—85%. From 100 g of chitin of 80% moisture, 80 g chitozan of 75% moisture or 25 g of dry chitozan were obtained.

The reaction of deacetylation was carried out at 105° C. in 50% NaOH solution, with a reaction time of 40 minutes. The viscosity of chitin obtained—2,000 centistocks; content of mineral substances inchitozan—0.0%; protein—0%, lipids—0%. The yield of chitozan—80%.

EXAMPLE 2

Frozen chitin-containing waste, roughly milled, with a 50% concentration of protein in the raw material, is electrochemically treated with a constant current of 4 A, density—0.05 $A/cm^2$, voltage—50 V, in a 0.15% NaOH solution, at a phase proportion of 1:1.5 (the weight of the chitin-containing raw material to the weight of the solution), at 70° C., for 10 minutes, with agitation. The reaction mixture is separated into chitin and hydrolysate. The chitin obtained is then washed with water.

Obtained: 90 g of chitin with 70% moisture; a 90% chitozan yield from chitin. From 100 g of moist chitin, 80 g of moist chitozan are obtained. The yield of chitozan in proportion to initial chitin is 80%. The deacetylation process is carried out at 105° C. in a 50% NaOH solution, with a reaction time of 50 minutes, with agitation. The viscosity of chitozan obtained is greater than or equal to 2,000 centistocks; content of mineral substances—0%, protein—0%, lipids—0%.

Therefore, having presented our invention, what we claim is:

1. A method of producing chitin and chitozan from chitin-containing raw materials, comprising the steps of
   fragmenting a chitin-containing raw material;
   alkali treating the fragmented raw material in NaOH solution and simultaneously agitating the same so as to produce chitin;
   washing the thusly produced chitin;
   subsequently deacetylating the washed chitin so as to produce chitosan;
   washing the thusly produced chitosan,
   conducting said alkali treating step by an electrochemical process with a constant electrical current source of 4–11 A, a density of 0.05–0.2 $A/cm^2$, a current of 15–50 V, for 10–45 minutes, with the raw material and NaOH solution at a proportion of 1:1.5–1:4 while the concentration of NaOH solution remains 0.15–2%.

2. A method as defined in claim 1; and further comprising the step of using as the raw material a material selected from the group consisting of insects, hydroids, shells of crabs, lobsters, langostinos, crayfish, shrimp and starfish, and chitin-containing waste.

* * * * *